(12) United States Patent
Loh

(10) Patent No.: US 6,175,510 B1
(45) Date of Patent: Jan. 16, 2001

(54) DIRECT CONVERSION UNINTERRUPTIBLE POWER SUPPLY

(76) Inventor: Pit-Kin Loh, 53, Senawang Industrial Estate Seremban, Negeri Sembilan 70450 (MY)

(*) Notice: Under 35 U.S.C. 154(b), the term of this patent shall be extended for 0 days.

(21) Appl. No.: 09/287,489

(22) Filed: Apr. 6, 1999

(51) Int. Cl.[7] .................................. H02M 5/45; H02J 7/00

(52) U.S. Cl. .................................................. 363/37; 307/66
(58) Field of Search .................................. 307/45, 46, 48, 307/66, 71; 363/34, 37; 323/225

(56) References Cited

U.S. PATENT DOCUMENTS

| | | | |
|---|---|---|---|
| 5,631,814 | * | 5/1997 | Zak ........................................... 363/37 |
| 5,959,369 | * | 9/1999 | Descombes et al. .................... 307/48 |

* cited by examiner

*Primary Examiner*—Jessica Han
(74) *Attorney, Agent, or Firm*—Michael Best & Friedrich LLP

(57) ABSTRACT

An uninterruptible power supply (UPS) device 10 is described having only half the number of inductors and storage capacitors of a conventional UPS. The UPS 10 has an input stage 12 connected to an AC power supply and an output stage 14 for supplying AC power to an appliance. The input stage 12 has a first switching means 16 connected in series with the output stage 14 and a second switching means 18 connected in parallel with the output stage 14. The output stage 14 has a third switching means 20 connected in series with the input stage 12 and a fourth switching means 22 connected in parallel with the input stage 12. Each of the switching means 16, 18, 20 and 22 is capable of switching current in two directions depending on control signals supplied to the switching means by a controller 24. The controller 24 controls the direction of current through each of the respective switching means in response to detected changes in power conditions. Each of the switching means 16, 18, 20 and 22 are controlled by controller 24 to be in either an ON condition, an OFF condition or a switching condition in which the switching means is switched at high frequency. Replacement of the four bulky items in a conventional UPS with a single inductor and a small high frequency storage capacitor results in a significant reduction in physical size. The remainder of the components in the UPS are mainly semi-conductors which therefore lends itself to high integration.

19 Claims, 14 Drawing Sheets

DIRECT CONVERSION UNINTERRUPTIBLE POWER SUPPLY

FIELD OF THE INVENTION

The present invention relates to an improved uninterruptible power supply (UPS) and relates particularly, though not exclusively, to a UPS for supplying uninterrupted power to a computer.

BACKGROUND TO THE INVENTION

Most companies and organisations rely on the public power supply grid for the supply of electrical power to machinery, lighting, laboratory and office equipment. In many modem buildings there is generally a back-up power supply, typically a diesel engine powered generator, to supply internal power for the building in the event of power failure. However sensitive electrical equipment such as computer systems and telecommunications equipment are frequently provided with a dedicated uninterruptible power supply (UPS) to ensure that there is no interruption to the supply of electrical power that may result in the loss of valuable information held in volatile memory. A UPS is also intended to regulate the supply of electrical power to an appliance so as to minimise fluctuations in the voltage supplied to the appliance.

A typical prior art UPS is connected to the AC power grid and converts the incoming AC voltage to a bipolar DC voltage across two storage capacitors. This bipolar DC voltage is then reconverted to a regulated AC output voltage. The back-up battery voltage is converted to a high bipolar DC voltage and feeds into the storage capacitors in the event that the input AC voltage falls below an acceptable level. There are a number of disadvantages with such conventional UPS technology. Firstly, there are inefficiencies and power losses associated with the need to convert the voltage twice, from AC to DC and vice versa. Secondly, the two storage capacitors are quite bulky because they need to filter out the 50/60 Hz voltage ripple. They are also costly because they need to have high ripple current capability, high capacitance and high voltage characteristics. Further, this type of UPS circuit does not readily lend itself to a high level of integration.

SUMMARY OF THE INVENTION

The present invention was developed with a view to providing an improved UPS which is less susceptible to at least some of the above-noted disadvantages of the prior art.

According to one aspect of the present invention there is provided an uninterruptible power supply device, the device comprising:

an input stage connected to an AC power supply and an output stage for supplying AC power to an appliance;

wherein said input stage has a first switching means connected in series with the output stage and a second switching means connected in parallel with the output stage, wherein each of said switching means is capable of switching current in two directions; and, a controller operatively connected to said first and second switching means for controlling the direction of current through each of the respective switching means in response to detected changes in power conditions whereby, in use, regulated AC power can be supplied from the output stage.

Preferably the output stage has a third switching means connected in series with the input stage and a fourth switching means connected in parallel with the input stage, and said controller is also operatively connected to said third and fourth switching means.

Preferably said input stage and output stage share a common neutral line and said first switching means and third switching means are connected in series with an inductor therebetween.

Preferably the device further comprises:

a battery-powered switching section for supplying back-up power in the event of interruption of power to the input stage.

Typically said input stage and output stage each have a capacitor connected in parallel with the input and the output respectively.

Advantageously the device further comprises a single storage capacitor connected to an output of said battery-powered switching section for filtering an output voltage from said switching section. Preferably fifth and sixth switching means are provided for connecting said battery-powered switching section to said input stage of the device, said fifth and sixth switching means also being operatively connected to said controller.

In an alternative embodiment said first switching means is one of a pair of first switching means respectively connected to the respective ends of a first winding of a high frequency transformer, and said second switching means is one of a pair of second switching means respectively connected to the respective ends of a second winding of the high frequency transformer.

Preferably, the input stage also has a third switching means connected in parallel with the output stage. Preferably said third switching means is one of a pair of third switching means respectively connected to the respective ends of the second winding of the transformer.

Preferably said high frequency transformer has three separate windings, and said battery-powered switching section is coupled to the input stage via a third winding of the high frequency transformer.

According to another aspect of the present invention there is provided a method of controlling an uninterruptible power supply device, the method comprising the steps of:

monitoring AC power supplied to an input stage of the device;

monitoring AC power supplied from an output stage of the device;

providing first and second switching means in the input stage connected in series and in parallel respectively with the output stage, and wherein each of said switching means is capable of switching current in two directions; and, controlling the direction of current through each of the first and second switching means in response to detected changes in power conditions whereby, in use, regulated power can be supplied from the output stage.

Preferably the method further comprises:

providing third and fourth switching means in the output stage connected in series and in parallel respectively with the input stage; and, controlling the direction of current through said third and fourth switching means in response to detected changes in power conditions.

Preferably the method further comprises:

providing a battery-powered switching section for supplying back-up power in the event of interruption of power supplied to the input stage, and wherein a single storage capacitor is connected to an output of said battery-powered switching section for filtering an output voltage from said switching section.

Preferably the method further comprises:

monitoring the voltage across said storage capacitor and comparing it with the voltage of the AC power supplied from the output stage.

Preferably the method further comprises comparing the voltage of the AC power supplied from the output stage with a reference voltage representing the desired output voltage of the device.

BRIEF DESCRIPTION OF THE DRAWINGS

In order to facilitate a more comprehensive understanding of the nature of the invention preferred embodiments of the uninterruptible power supply device and method of control will now be described in detail, by way of example only, with reference to the accompanying drawings in which:

FIG. 1 illustrates a typical conventional UPS in which diodes $D_1$, $D_2$, capacitor $C_1$, inductor L, and transistor $Q_1$ convert the AC input voltage $V_{in}$ into a bipolar DC voltage on storage capacitors $C_2$ and $C_3$. $L_1$ and Q, basically form a boost stage to convert the input voltage sine-wave to DC with a high input power factor. Transistors $Q_2$, $Q_3$, inductor $L_2$ and capacitor $C_4$ convert the bipolar DC voltage on $C_2$, $C_3$ into a regulated AC output voltage, $V_{out}$. Transistors $Q_4$, $Q_5$ and transformer $T_1$ convert the DC voltage from battery $B_1$ to a high bipolar DC voltage to feed into storage capacitor, $C_2$, $C_3$ in the case when $V_{in}$ falls below an acceptance level. Inductors $L_3$, $L_4$ are required to filter out the pulsating current of the output voltage of transformer $T_1$, so that the pulse width modulation performed by transistors $Q_4$, $Q_5$ can control the voltage across storage capacitors $C_2$, $C_3$. There are other prior art UPS configurations, but this is the most popular because the neutral line is common between the input and the output. This feed-through neutral line is a safety requirement in some countries, for example, the U.S.A.

As noted above, there are a number of disadvantages of this type of conventional UPS. Firstly, there is the need to convert the voltage twice, from AC to DC and then from DC back to AC again. This requires two inductors $L_1$, $L_2$ and two storage capacitors $C_2$, $C_3$. $L_1$, $L_2$ can be quite bulky because at high power (usually greater than or equal to 1 kVA) and high voltage (greater than 300 volt DC) it is difficult to switch much higher than 20 kHz without generating too much heat or noise with existing device technology. Storage capacitors $C_2$, $C_3$ are bulky because they need to filter out the 50/60 Hz voltage ripple. They are also costly because they need to have high ripple current capability, high capacitance and high voltage.

Secondly, transistors $Q_2$, $Q_3$ need to be rated at twice the peak voltage of the AC input, because they are switching across the total voltage of storage capacitors $C_2$ and $C_3$. The higher voltage semiconductor devices have higher switching losses and higher on-state voltage than those which have half the voltage rating.

Figure 2:
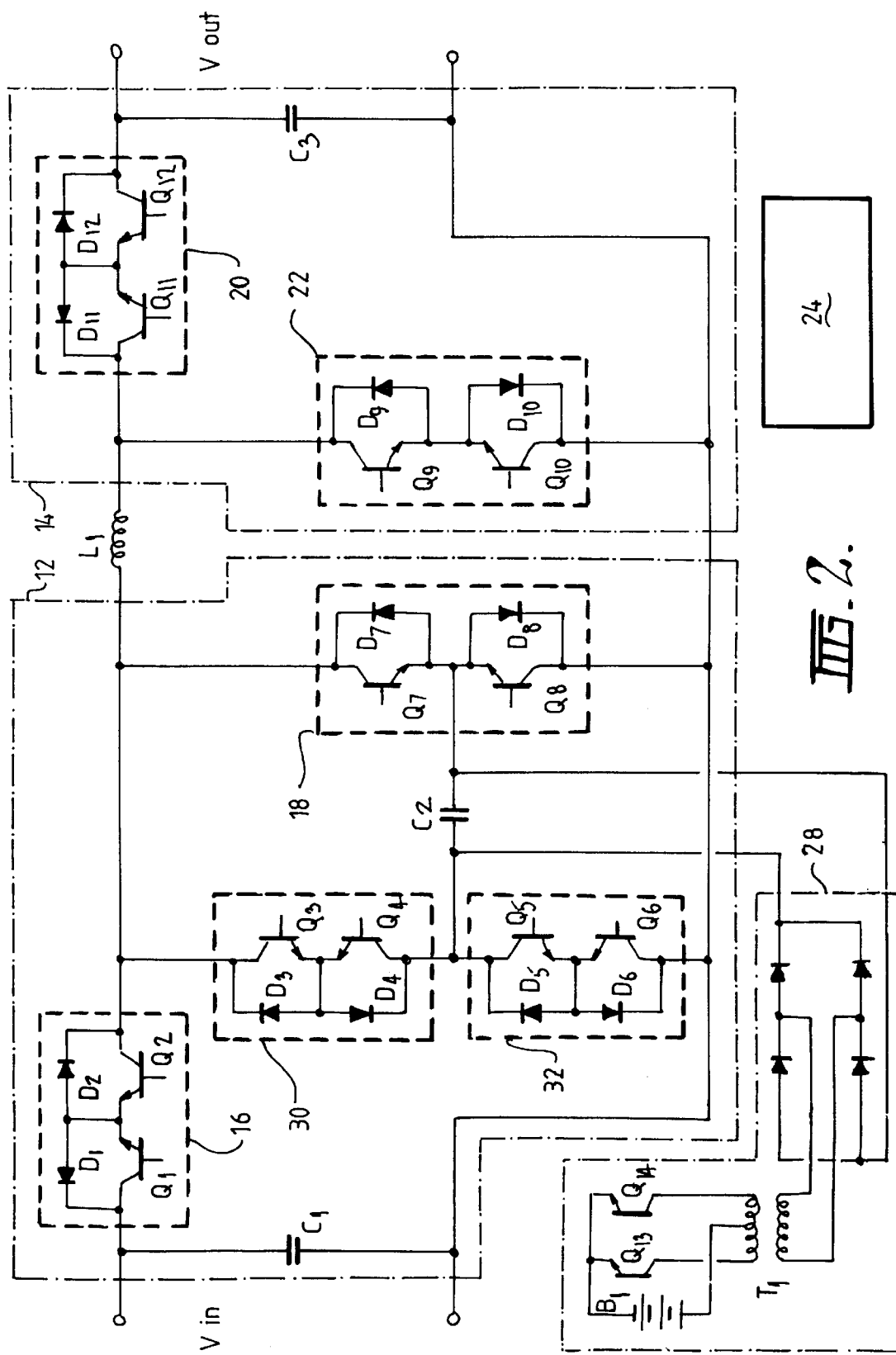
FIG. 2 is a circuit diagram of a first embodiment of a UPS in accordance with the present invention.

FIG. 2 illustrates a first embodiment of a UPS 10 in accordance with the present invention, having an input stage 12 connected to an AC power supply with voltage $V_{in}$, and an output stage 14 for supplying AC power with voltage $V_{out}$ to an appliance (not shown). The input stage 12 has a first switching means 16 connected in series with the output stage 14 and a second switching means 18 connected in parallel with the output stage 14. The output stage 14 has a third switching means 20 connected in series with the input stage 12 and a fourth switching means 22 connected in parallel with the input stage 12. Each of the switching means 16, 18, 20, 22 is capable of switching current in two directions depending on control signals supplied to the switching means by a controller 24. Controller 24 is operatively connected to the first, second, third and fourth switching means 16, 18, 20 and 22, however the connections have been omitted from FIG. 2 for simplicity.

The controller 24 controls the direction of current through each of the respective switching means in response to detected changes in power conditions. Each of the switching means 16, 18, 20 and 22 are controlled by controller 24 to be in either an ON condition, an OFF condition or a switching condition in which the switching means is switched at high frequency. The switching pattern of the switching means selected by controller 24 depends on a comparison of the detected voltages $V_{in}$, $V_{out}$, $V_{ref}$ and $V_{C2}$. $V_{ref}$ is the desired output voltage and $V_{out}$ is the actual output voltage. Controller 24 senses and monitors $V_{in}$, $V_{out}$ and $V_{C2}$ and compares $V_{out}$ with $V_{ref}$ and the other voltages to determine the control of the respective switching means so that, in use, regulated AC power can be supplied from the output stage 14. Controller 24 typically includes a microcontroller with some custom-designed logic for effecting the required control in response to prescribed selection criteria. The prescribed selection criteria will be described in further detail below.

Figure 1:
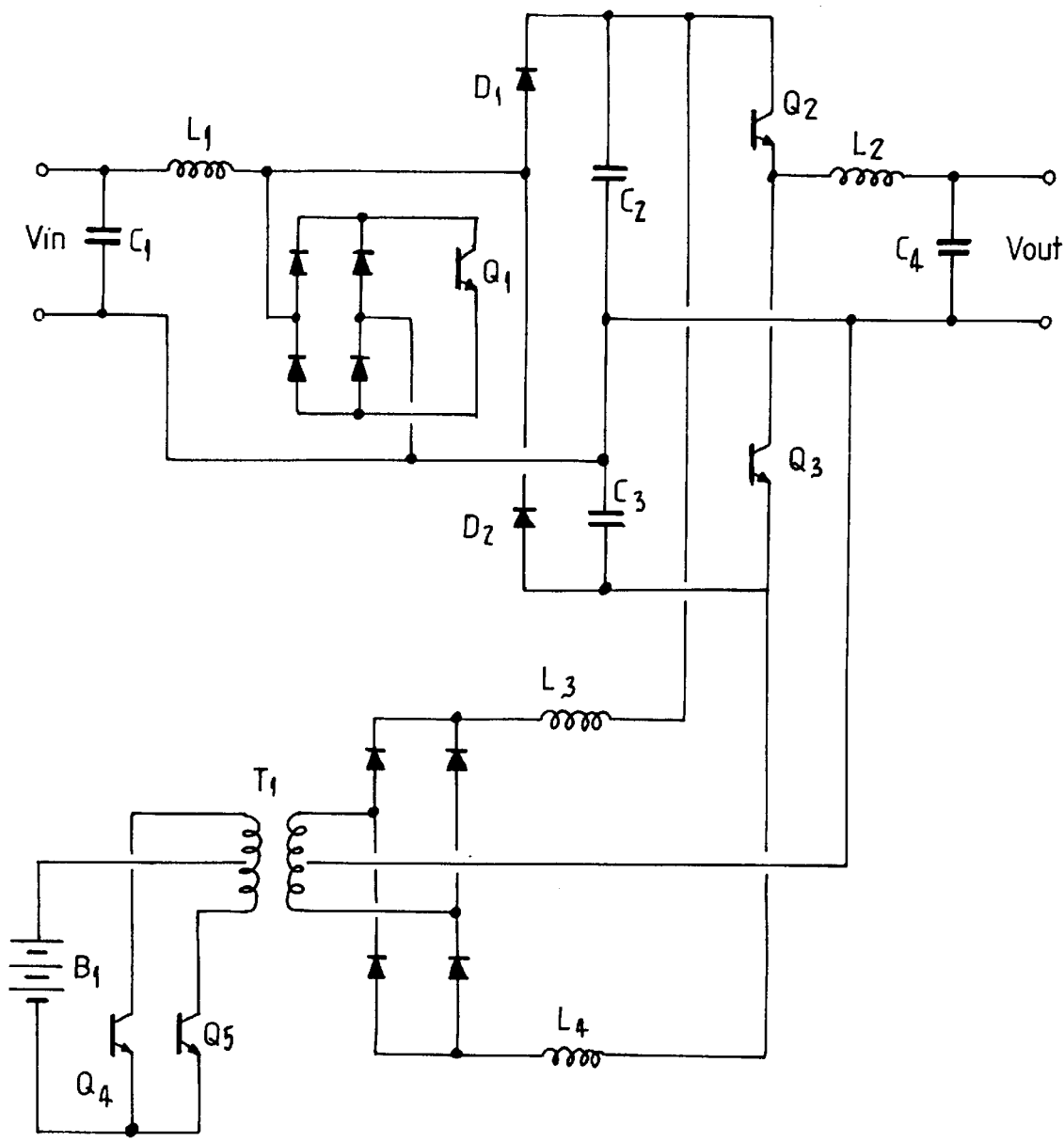
FIG. 1 is a circuit diagram of a typical prior art uninterruptible power supply (UPS)

In this embodiment the input stage 12 and the output stage 14 share a common neutral line 26, and the first switching means 16 and the third switching means 20 are connected in series with an inductor $L_1$ therebetween. Both the input stage 12 and the output stage 14 each have a capacitor $C_1$, $C_3$, connected in parallel with the input and the output respectively, similar to the conventional UPS illustrated in FIG. 1.

Preferably the UPS device of this embodiment further comprises a battery-powered switching section 28 for supplying back-up power in the event of interruption of power to the input stage 12. If the input voltage $V_{in}$ falls below an acceptable level, the battery-powered switching section 28 needs to be utilised to maintain an uninterrupted supply of AC voltage at the output, $V_{out}$. Advantageously, the UPS device has only a single small storage capacitor $C_2$ connected to an output of the battery-powered switching section 28 for filtering the output voltage from the switching section 28.

During battery operation, transistors $Q_{13}$, $Q_{14}$, and transformer $T_1$ convert the battery voltage to a higher DC voltage which is fed to storage capacitor $C_2$. (If the battery voltage is high enough, it can be connected directly across $C_2$ without $Q_{13}$, $Q_{14}$, and $T_1$. This is normally the case in higher power UPS devices where there are enough batteries to string together). The voltage across capacitor $C_2$ is $V_{C2}$. In this embodiment, fifth and sixth switching means 30, 32 are provided for connecting the battery-powered switching section 28 to the input stage 12 of the device. The fifth and sixth switching means 30, 32 are also operatively connected to controller 24.

Each of the switching means employed in the UPS device may be any suitable switching device capable of switching current in two directions. In this embodiment, each of the switching means comprises a pair of transistors and a pair of diodes connected in parallel. If we consider for example the operation of the first switching means 16, when transistor $Q_1$ is ON current will flow through $Q_1$ and diode $D_2$. On the other hand, when transistor $Q_2$ is ON current will flow in the opposite direction through diode $D_1$. If both $Q_1$ and $Q_2$ are OFF, then current will not flow in either direction. Either $Q_1$ or $Q_2$ can also be switched at high frequency to produce a switching current through the device.

The switching pattern of the transistors as determined by controller 24 based on prescribed selection criteria will now be described in more detail with reference to FIGS. 3 to 18. In each case, the circuit diagram of the UPS in FIG. 2 has been simplified to illustrate the effective operation of the circuit.

Case 1 $V_{in}>V_{out}$ $V_{ref}>V_{out}$ $V_{in}>0$ $V_{out}\geq 0$

Figure 3:
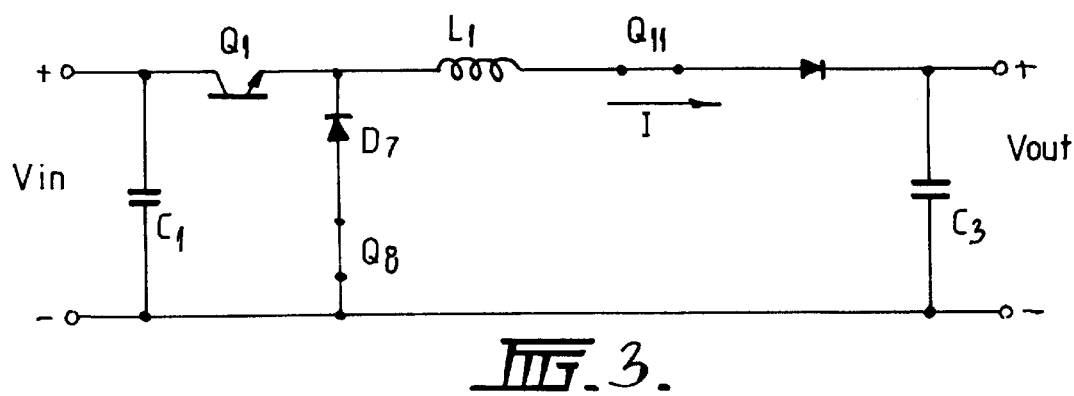
FIGS. 3 to 18 are simplified circuit diagrams of the UPS of FIG. 2 illustrating different modes of operation.

In this case, the input voltage $V_{in}$ needs to be stepped down to feed to the output, so as to bring $V_{out}$ up to the level of $V_{ref}$. This is accomplished by turning on transistor $Q_8$ in the second switching means 18, and tuning on transistor $Q_1$ in the third switching means 20. Transistor $Q_1$ in the first switching means 16 is switched at high frequency to regulate the current through inductor $L_1$. Transistor $Q_8$ is ON to allow free-wheeling current to flow through diode $D_7$. All of the other transistors in the respective switching means are OFF. In simplified form, the circuit is effectively as shown in FIG. 3.

Case 2 $V_{in}<V_{out}$ $V_{ref}>V_{out}$ $V_{in}>0$ $V_{out}\geq 0$

Figure 4:
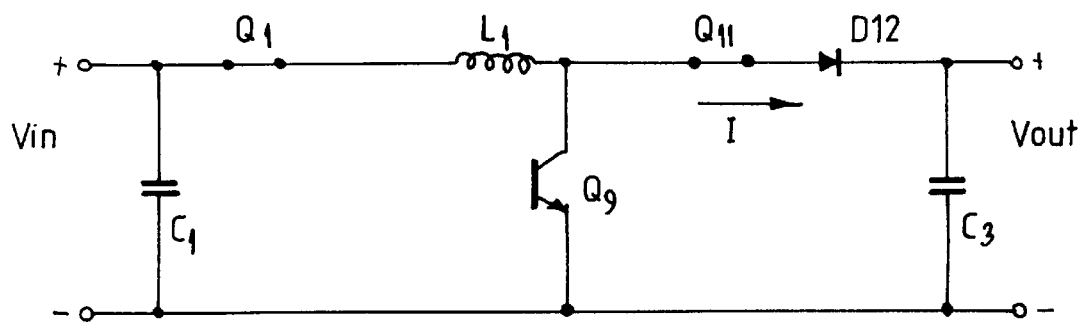
Figure 5:
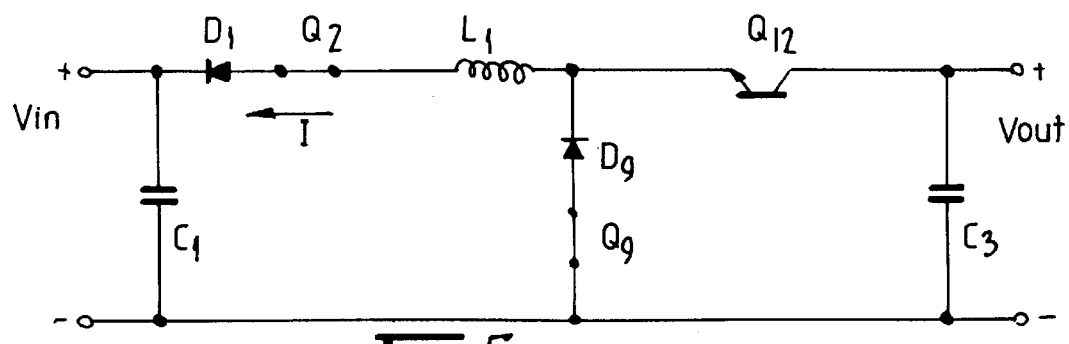
Figure 6:
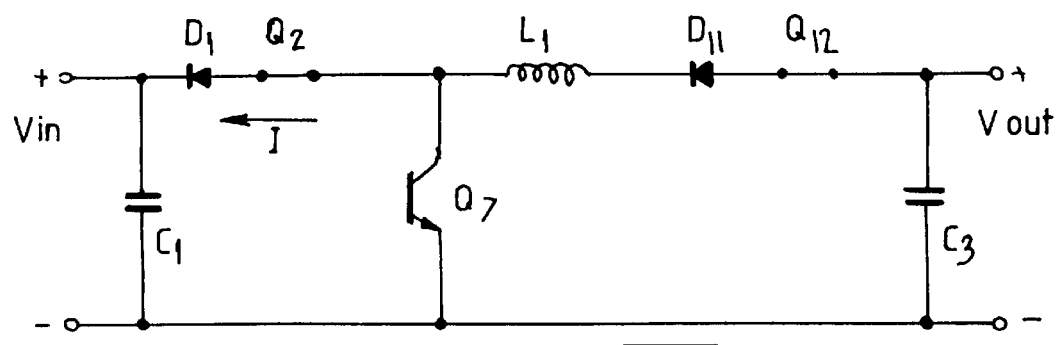
Figure 7:
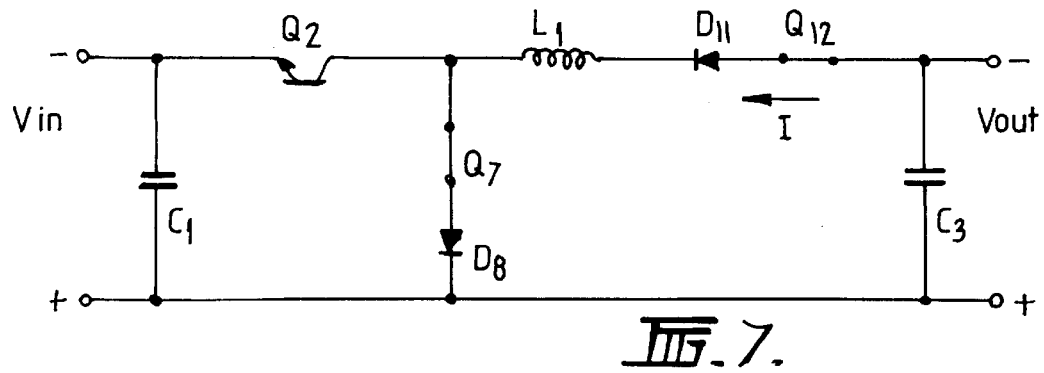
Figure 8:
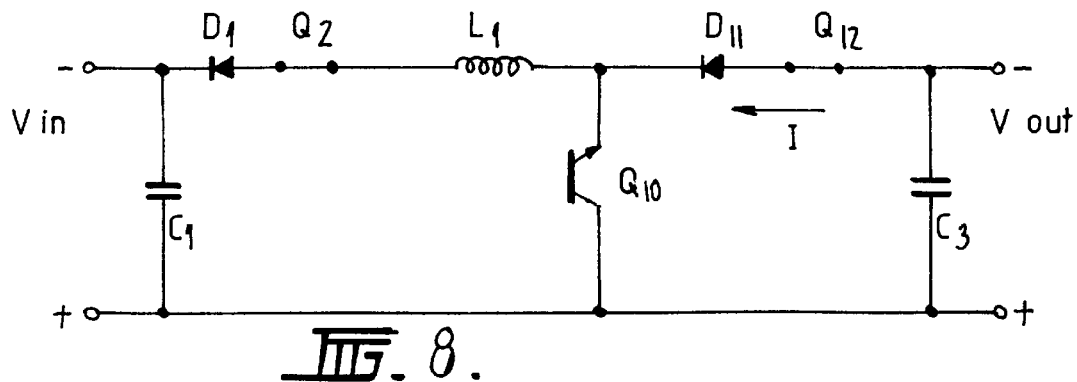
Figure 9:
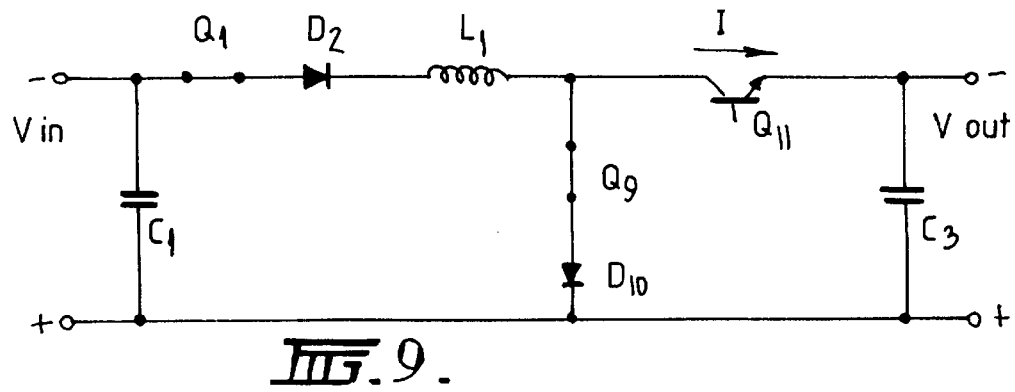
Figure 10:
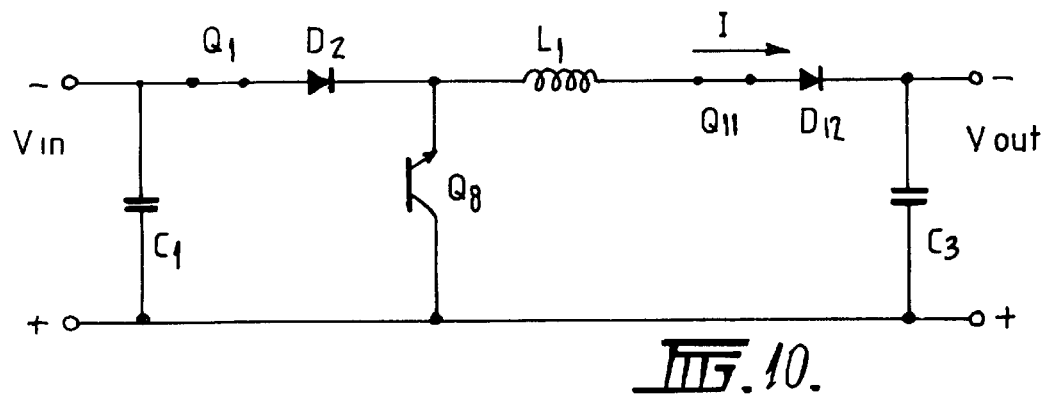
Figure 11:
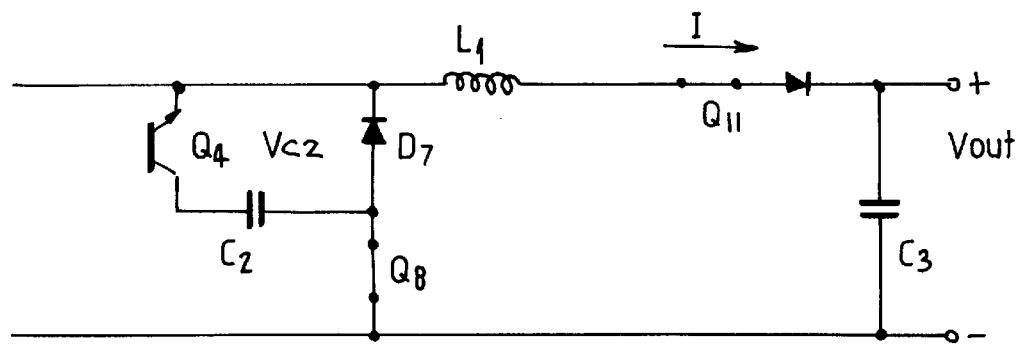
Figure 12:
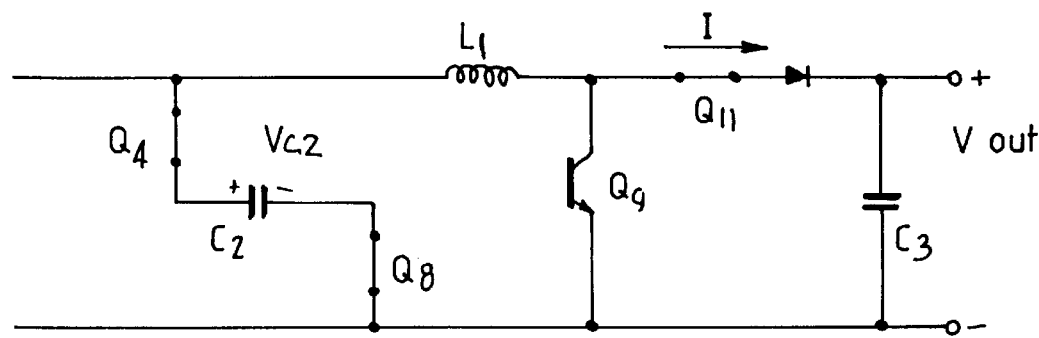
Figure 13:
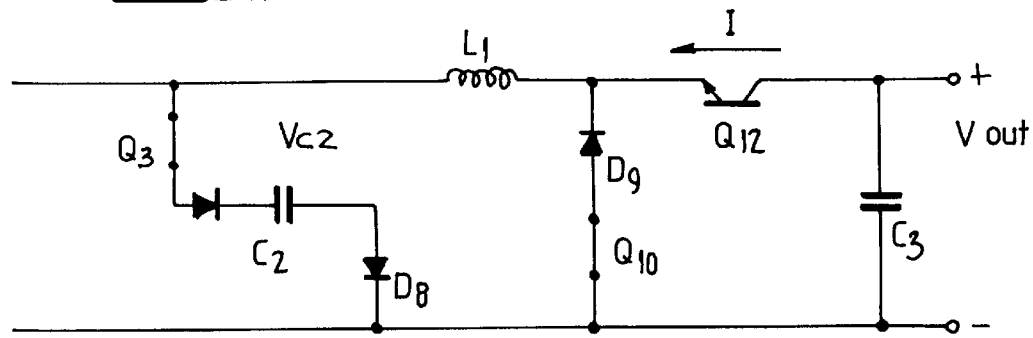
Figure 14:
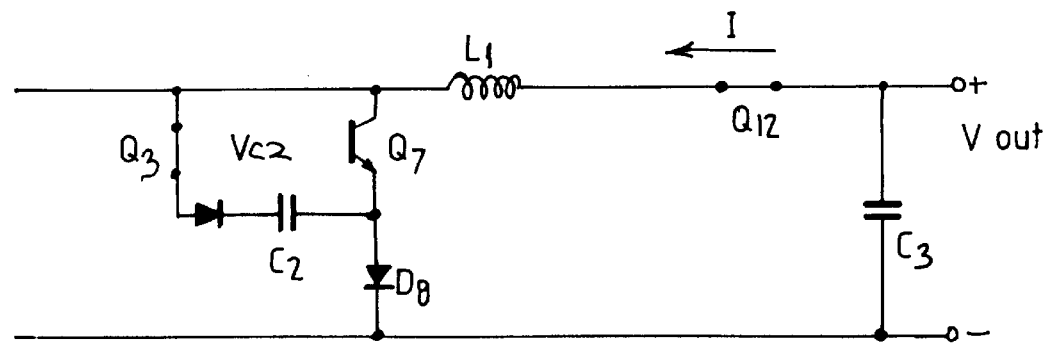
Figure 15:
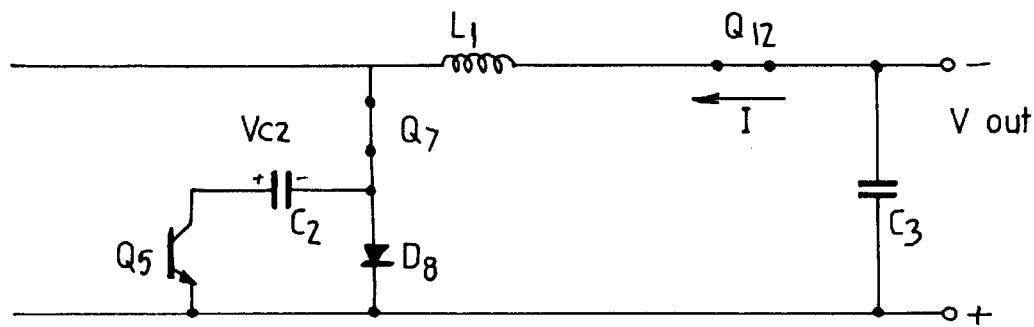
Figure 16:
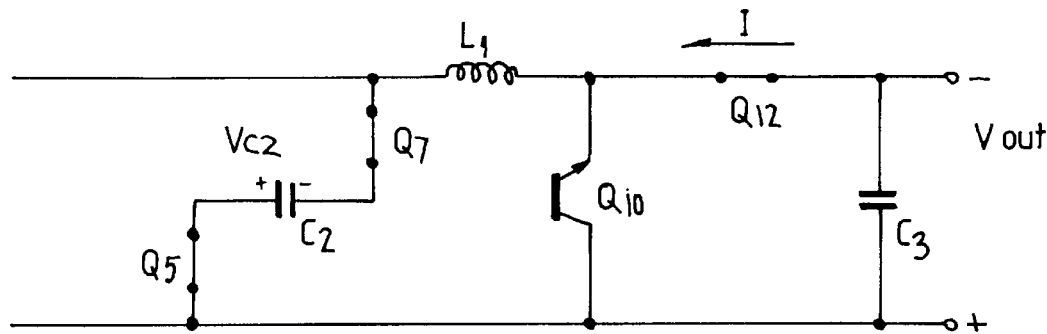
Figure 17:
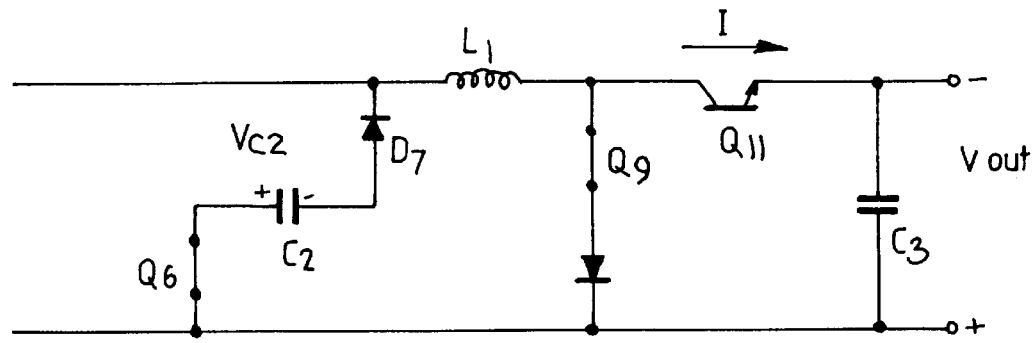
Figure 18:
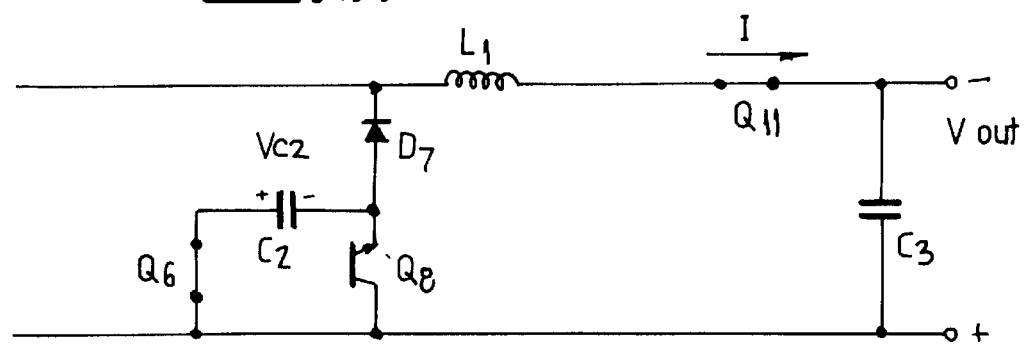

In this case, the input voltage needs to be stepped up to feed to the output, and to bring $V_{out}$ up to the level of $V_{ref}$. Transistor $Q_1$ in the first switching means 16 is ON and transistor $Q_{11}$ in the third switching means 20 is also ON, whereas transistor $Q_9$ in the fourth switching means 22 is switched at high frequency. In simplified form the circuit is effectively as shown in FIG. 4.

Case 3 $V_{out}>V_{ref}$ $V_{in}<V_{out}$ $V_{in}>0$ $V_{out}\geq 0$

In this case, because $V_{out}$ is greater than $V_{ref}$ the output voltage has excess voltage which needs to be returned to $V_{in}$ to bring $V_{out}$ down to the level of $V_{ref}$. (Note that in this case $V_{in}$ is less than $V_{out}$). Transistor $Q_2$ in the first switching means 16 is ON, as is transistor $Q_{10}$ in the fourth switching means 22. Transistor $Q_{12}$ in the third switching means 20 is switched at high frequency. In simplified form the circuit is effectively that shown in FIG. 5.

Case 4 $V_{out}>V_{ref}$ $V_{in}>V_{out}$ $V_{in}>0$ $V_{out}\geq 0$

This case is similar to case 3, but in this case $V_{in}$ is higher than $V_{out}$, and therefore $V_{out}$ needs to be stepped up to feed back to $V_{in}$. Transistor $Q_2$ in the first switching means 16 and transistor $Q_{12}$ in the third switching means 20 are again both ON. However, in this case transistor $Q_7$ in the second switching means 18 is switched at high frequency. In simplified form the circuit is effectively that shown in FIG. 6.

With each of cases 1 to 4 described above, the input voltage $V_{in}$ is positive and the output voltage $V_{out}$ is also positive. The next four cases apply to the situation where $V_{in}$ is negative and $V_{out}$ is also negative. Each of cases 5 to 8 is therefore basically the complement of the corresponding cases 1 to 4.

Case 5 $V_{in}<V_{out}$ $V_{ref}<V_{out}$ $V<0$ $V_{out}\leq 0$

This case is the complement of case 1. Transistor $Q_7$ in the second switching means 18 and transistor $Q_{12}$ in the third switching means 20 are both ON. Transistor $Q_2$ in the first switching means 16 is switched at high frequency to regulate the current through $L_1$. In simplified form, the circuit is that shown in FIG. 7. The direction of current I is the reverse to that of FIG. 3.

Case 6 $V_{in}>V_{out}$ $V_{ref}<V_{out}$ $V_{in}<0$ $V_{out}\leq 0$

This case is the compliment of case 2 above. Transistor $Q_2$ of the first switching means 16 and transistor $Q_{12}$ of the third switching means 20 are both on. Transistor $Q_{10}$ of the fourth switching means 22 is switched at high frequency. In the simplified form, the circuit is that illustrated in FIG. 8.

Case 7 $V_{out}<V_{ref}$ $V_{in}>V_{out}$ $V_{in}<0$ $V_{out}\leq 0$

This case is the compliment of case 3 above. Transistor $Q_1$ in the first switching means 16 and transistor $Q_9$ in the fourth switching means 22 are both on. Transistor $Q_{11}$ in the third switching means 20 is switched at high frequency. In this case $V_{in}$ has excess voltage which needs to be fed forward to $V_{out}$ to bring $V_{out}$ back up to the level of $V_{ref}$. In simplified form, the circuit is that illustrated in FIG. 9.

Case 8 $V_{out}<V_{ref}$ $V_{in}<V_{out}$ $V_{in}<0$ $V_{out}\leq 0$

This case is the compliment of case 4 above, and is similar to case 7 except that $V_{in}$ is lower then $V_{out}$, so that $V_{in}$ needs to be stepped up to feed forward to $V_{out}$. Transistor $Q_1$ of the first switching means 16 is on and transistor $Q_{11}$ of the third switching means 20 is also on. Transistor $Q_8$ of the second switching means 18 is switched at hight frequency. In simplified form, the circuit is that illustrated in FIG. 10.

In each of the above eight cases the operation of the UPS assumes that $V_{in}$ is at an acceptable level. However, when $V_{in}$ falls below an acceptable level, the battery needs to be utilised to keep the output voltage $V_{out}$ constantly supplied to an appliance. The following cases describe this mode of operation in which the battery powered switching section 28 is utilised.

Case 9 $V_{C2}>V_{out}$ $V_{ref}>V_{out}\geq 0$

This case is similar to case 1 in operation. Transistor $Q_8$ of the second switching means 18 is on and transistor $Q_{11}$ of the third switching means 20 is also on. Transistor $Q_4$ of the fifth switching means 30 is switched at high frequency. All other transistors are off. In simplified form, the circuit is that illustrated in FIG. 11.

Alternatively, the same result will be achieved if transistor $Q_4$ of the fifth switching means 30 is on and transistor $Q_{11}$ is on, whereas transistor $Q_8$ of the second switching means 18 is switched.

Case 10 $V_{C2}>V_{out}$ $V_{ref}>V_{out}$ $V_{out}\geq 0$

This case is operationally similar to case 2. Transistor $Q_4$ of the fifth switching means 30 is on, transistor $Q_8$ of the second switching means 18 is on and transistor $Q_{11}$ of the third switching means 20 is also on. Transistor $Q_9$ of the fourth switching means 22 is switched at high frequency. In simplified form, the circuit is that illustrated in FIG. 12.

Case 11 $V_{out}>V_{ref}$ $V_{C2}<V_{out}$ $V_{out}\geq 0$

This case is operationally similar to case 3. Transistor $Q_3$ of the fifth switching means 30 is on and transistor $Q_{10}$ of the fourth switching means 22 is also on. Transistor $Q_{12}$ of the third switching means 20 is switched to high frequency. In simplified form, the circuit is that illustrated in FIG. 13.

Case 12 $V_{out}>V_{ref}$ $V_{C2}>V_{out}$ $V_{out}\geq 0$

This case is operationally similar to case 4. Transistor $Q_3$ of the fifth switching means 30 is on and transistor $Q_{12}$ of the third switching means 20 is also on. Transistor $Q_7$ of the second switching means 18 is switched at high frequency. In simplified form the circuit is that illustrated in FIG. 14.

In each of cases 9 to 12 above, the UPS addresses the situation where $V_{out}$ is greater than 0. If $V_{out}$ is less than 0, the polarity of the battery voltage across $C_2$ ($V_{C2}$) applied to the output needs to be reversed. Cases 13 to 16 illustrate the operation of the UPS for $V_{out}$ is less than 0 and $V_{in}$ is below an acceptable level.

Case 13 $V_{C2}>|V_{out}|$ $|V_{ref}|<V_{out}$ $V_{out}\leq 0$

In this case, $V_{C2}$ is more than the absolute value of $V_{out}$, and $V_{out}$ is negative. This case is operationally similar to case 5. $Q_7$ of the second switching means 18 is switched on and $Q_{12}$ of the third switching means 20 is also switched on. $Q_5$ of the sixth switching means 32 is switched at high frequency. In simplified form, the circuit is that illustrated in FIG. 15. Alternatively, $Q_5$ is on, $Q_{12}$ is on and $Q_7$ of the second switching means 18 is switched at high frequency.

Case 14 $V_{C2}<|V_{out}|$ $V_{ref}<V_{out}$ $V_{out}\leq 0$

In this case $V_{C2}$ is less than the absolute value of $V_{out}$. This case is operationally similar to case 6. Transistor $Q_5$ of the sixth switching means 32 is on, transistor $Q_7$ of the second switching means 18 is on and transistor $Q_{12}$ of the third switching means 20 is also on. Transistor $Q_{10}$ of the fourth switching means 22 is switched at high frequency. In simplified form, the UPS circuit is that illustrated in FIG. 16.

Case 15 $V_{out}<V_{ref}$ $V_{C2}<|V_{out}|$ $V_{out}\leq 0$

This case is operationally similar to case 7 above. Transistor $Q_6$ of the sixth switching means 32 is on, and transistor $Q_9$ of the full switching means 22 is also on. Transistor $Q_{11}$ of the third switching means 20 is switched at high frequency. In simplified form, the circuit is that illustrated in FIG. 17.

Case 16 $V_{out}<V_{ref}$ $V_{C2}>|V_{out}|$ $V_{out}\leq 0$

This case is operationally similar to case 8 above. Transistor $Q_6$ of the sixth switching means 32 is ON, and transistor $Q_{11}$ of the third switching means 20 is also ON. Transistor $Q_8$ of the second switching means 18 is switched at high frequency. In simplified form, the circuit is that illustrated in FIG. 18.

Figure 19:
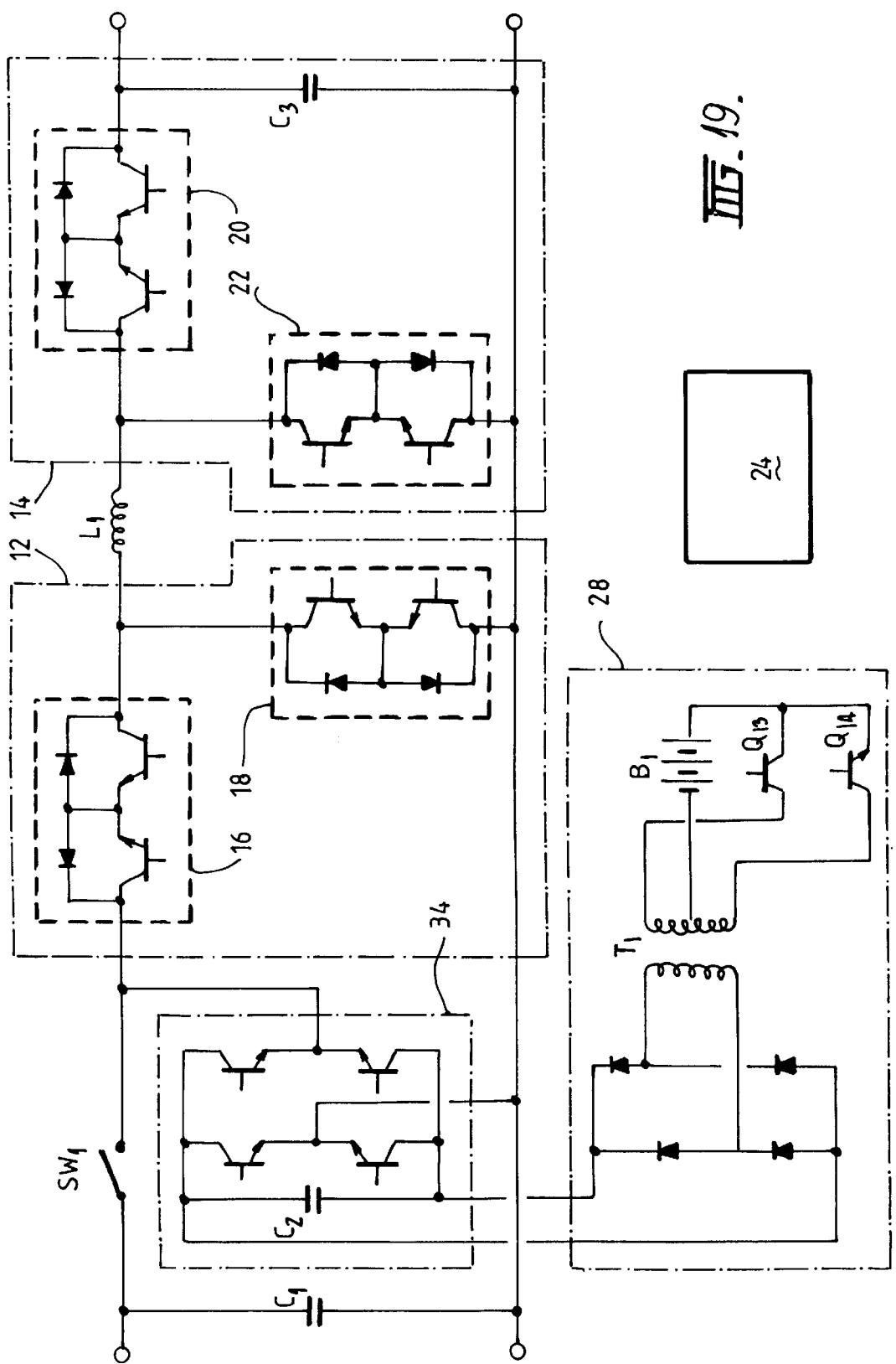
FIG. 19 is a circuit diagram of a second embodiment of the UPS in accordance with the present invention.

The sixteen cases described above completes the full range of modes of operation required for the UPS to supply a regulated output voltage in typical computer and telecommunications applications. Other configurations are possible, and the UPS according to the invention is not limited to the particular embodiment illustrated in FIG. 2. For example, substantially the same results can be achieved by rearranging the position of the battery powered switching section 28 as shown in FIG. 19. The like parts in the circuit of FIG. 19 with that of FIG. 2 are identified with the same reference numerals. Switch SW1 can be a relay, or for higher speed it can be a combination of two transistors and two diodes similar to the switching means 16, 18, 20 and 22. In this embodiment, transistor bridge 34 is employed together with switch SW1 to control the application of the battery voltage across capacitor C2 to the input stage 12 of the UPS. In other respects the operation of the UPS of FIG. 19 is similar to that of FIG. 2.

Figure 20:
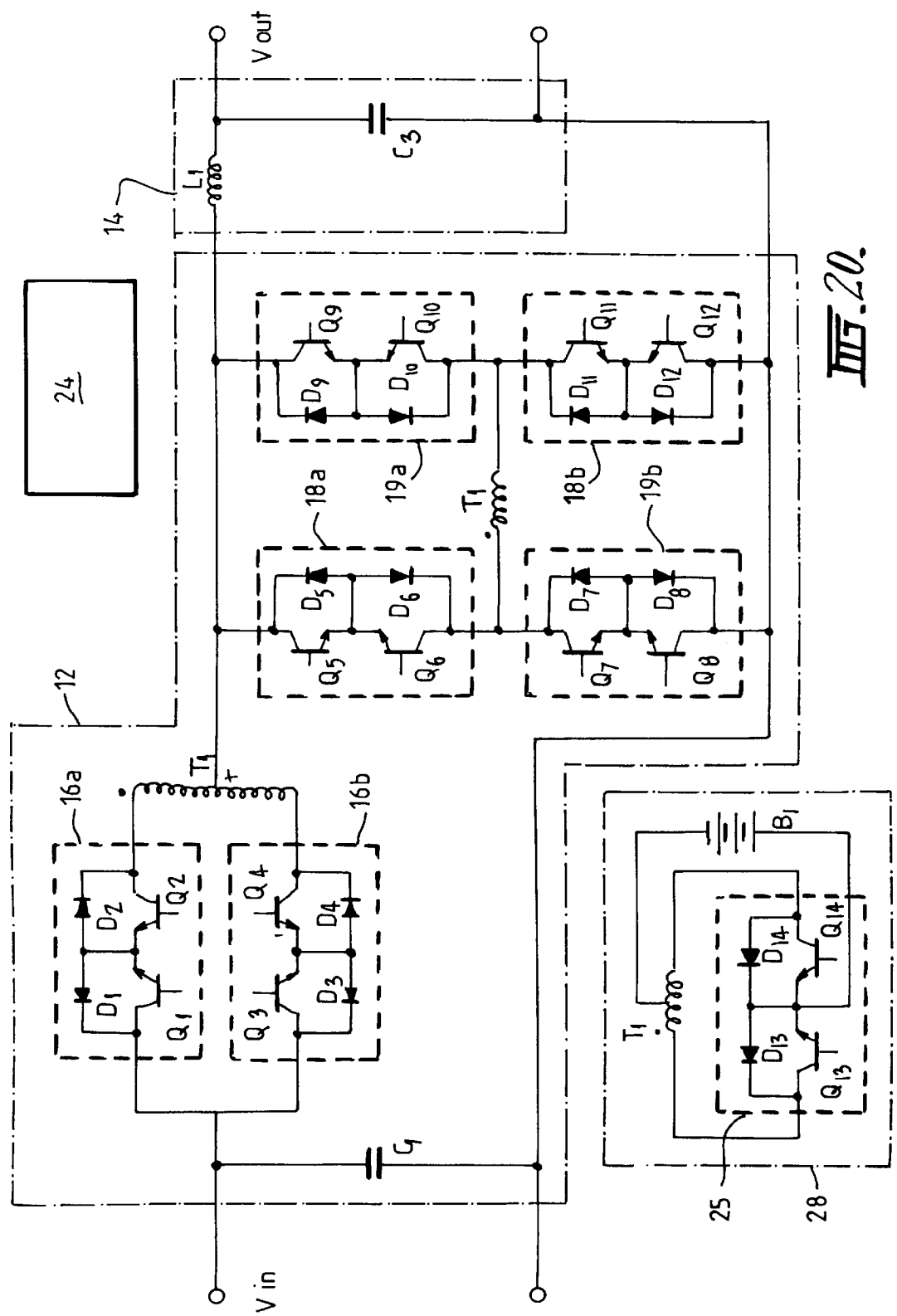
FIG. 20 is a circuit diagram of a third embodiment of the UPS in accordance with the present invention; and, FIGS. 21 to 26 are switching diagrams illustrating graphically different modes of operation of the UPS of FIG. 20.

A third embodiment of the UPS in accordance with the present invention is illustrated in FIG. 20. The like parts in the circuit FIG. 20 with that of the previous circuits are identified with the same reference numerals. In this embodiment, a high frequency transformer $T_1$ with three separate windings is employed. The turn ratio of $T_1$ determines the operating range of the input voltage $V_{in}$, i.e., the voltage range of $V_{in}$ which does not require the UPS to switch to battery operation. The turn ratio of $T_1$ is also dictated by the battery ($B_1$ voltage). This whole UPS system operates at a high switching frequency (typically >16 KHz) under the control of controller 24. The switching frequency is preferably above the audible noise level, but can be any frequency significantly higher than the frequency of $V_{in}$ (typically 50/60 Hz). Capacitor $C_1$ provides a high frequency path for the switching operation. Inductor $L_1$ and capacitor $C_2$ in the output stage 14 filter the output wave form, $V_{out}$.

The input stage 12 of this embodiment includes a pair of first switching means 16a and 16b connected in series with the output stage 14. The pair of first switching means 16a and 16b are respectively connected to the respective ends of a first winding of the high frequency transformer $T_1$. The output stage 14 is connected directly to a centre tap of the first winding of transformer $T_1$. The input stage 12 also includes a pair of second switching means 18a, 18b connected in parallel with the output stage 14. The pair of second switching means 18a and 18b are respectively connected to the respective ends of a second winding of the high frequency transformer $T_1$. Furthermore, in this embodiment the input stage 12 also has a pair of third switching means 19a, 19b connected in parallel with the output stage 14. The pair of third switching means 19a and 19b are also respectively connected to the respective ends of the second winding of $T_1$. During normal operation of the UPS, with $V_{in}$ within the operating range, high frequency switching of transformer $T_1$ by means of the first switching means 16, second switching means 18 and third switching means 19 add or subtract the input voltage $V_{in}$ by an amount dictated by the pulse width of the switching wave forms generated by controller 24 and the turn ratio of transformer $T_1$. In this manner, the UPS provides precise voltage regulation and, if desired, wave form correction of the output voltage $V_{out}$.

When $V_{in}$ moves out of the normal operating range, the first switching means 16a, 16b are instantly switched OFF by controller 24 to isolate the input voltage $V_{in}$ from the output stage 14. Simultaneously, the battery-powered switching section 28 is switched in by a fourth switching means 25 connected across a third winding of the high frequency transformer $T_1$. Switching over to battery operation by controller 24 is instantaneous, and therefore no discontinuities will appear in the waveform of the output voltage $V_{out}$. Once again, the desired waveform of the output voltage is regulated by controlling the pulse width and switching of the second and third switching means 18, 19 under the control of controller 24.

The switching pattern of the transistors in each of the first, second, third and fourth switching means as determined by controller 24, based on prescribed selection criteria, will now be described in more detail with reference to FIGS. 21 to 26. In each case, the switching waveforms supplied to the selected transistors in the first, second, third or fourth switching means are illustrated graphically to describe the effective operation of the UPS illustrated in FIG. 20.

Case 1 $V_{in}>V_{out}$ $V_{in}>0$ $V_{out}\geq 0$

Figure 21:
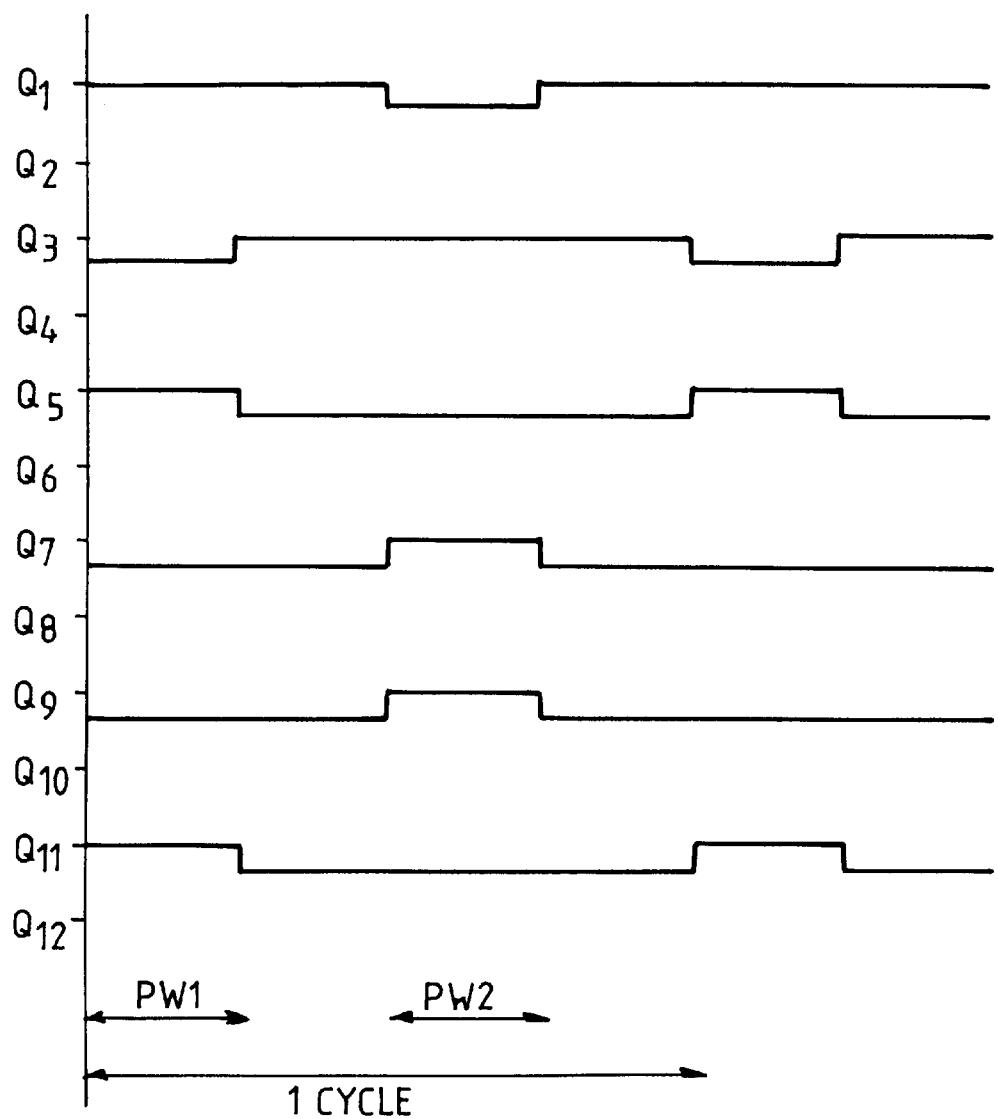

In this case, the switching waveforms for selected transistors in the first, second and third switching means are illustrated in FIG. 21. Transistors $Q_2$, $Q_4$, $Q_6$, $Q_8$, $Q_{10}$ and $Q_{12}$ are all ON during the whole cycle to provide a freewheeling path for the current to flow whilst the remaining transistors of the first, second and third switching means 16, 18 and 19 are switched in accordance with the switching waveforms illustrated. The output voltage $V_{out}$ is regulated by controlling the pulse width (PW) of the switching waveforms. PW1=PW2. In this case, the battery-powered switching section 28 is not required, and therefore transistors $Q_{13}$ and $Q_{14}$ are OFF.

It will be seen from FIG. 21 that during the first switching pulse interval (PW1) transistors $Q_5$ and $Q_{11}$ of the pair of first switching means 18a, 18b are both ON to provide a current path in one direction through the second winding of transformer $T_1$, whereas in the third switching interval (PW2) transistors $Q_9$ and $Q_7$ of the pair of third switching means 19a, 19b are both ON to provide to a current path in the reverse direction through the second winding of transformer $T_1$. In this way, the voltage across the second winding of transformer $T_1$ can be added or subtracted to the voltage provided at the centre tap of the first winding of transformer $T_1$ as required.

Case 2 $V_{in} < V_{out}$ $V_{in} > 0$ $V_{out} \geq 0$

Figure 22:
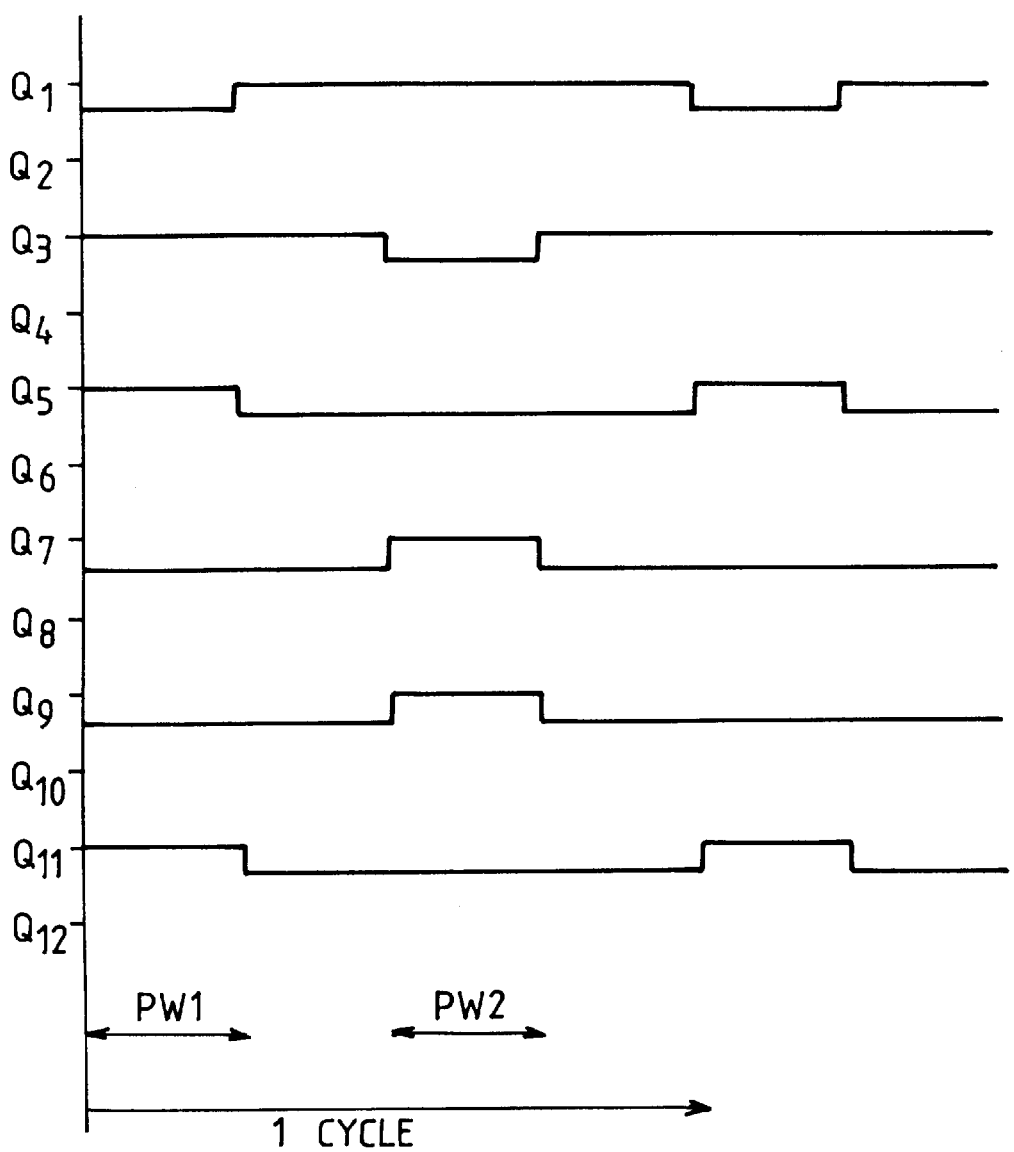

In this case, the switching waveforms required for the first, second and third switching means 16, 18 and 19 are as illustrated in FIG. 22. It will be seen that the switching waveforms in this case are similar to that of FIG. 21, except that the switching waveforms for transistors $Q_1$ and $Q_3$ have been reversed. However, in other respects the operation of the UPS in this mode is the same as in Case 1.

Case 3 $V_{in} < V_{out}$ $V_{in} < 0$ $V_{out} \leq 0$

Figure 23:
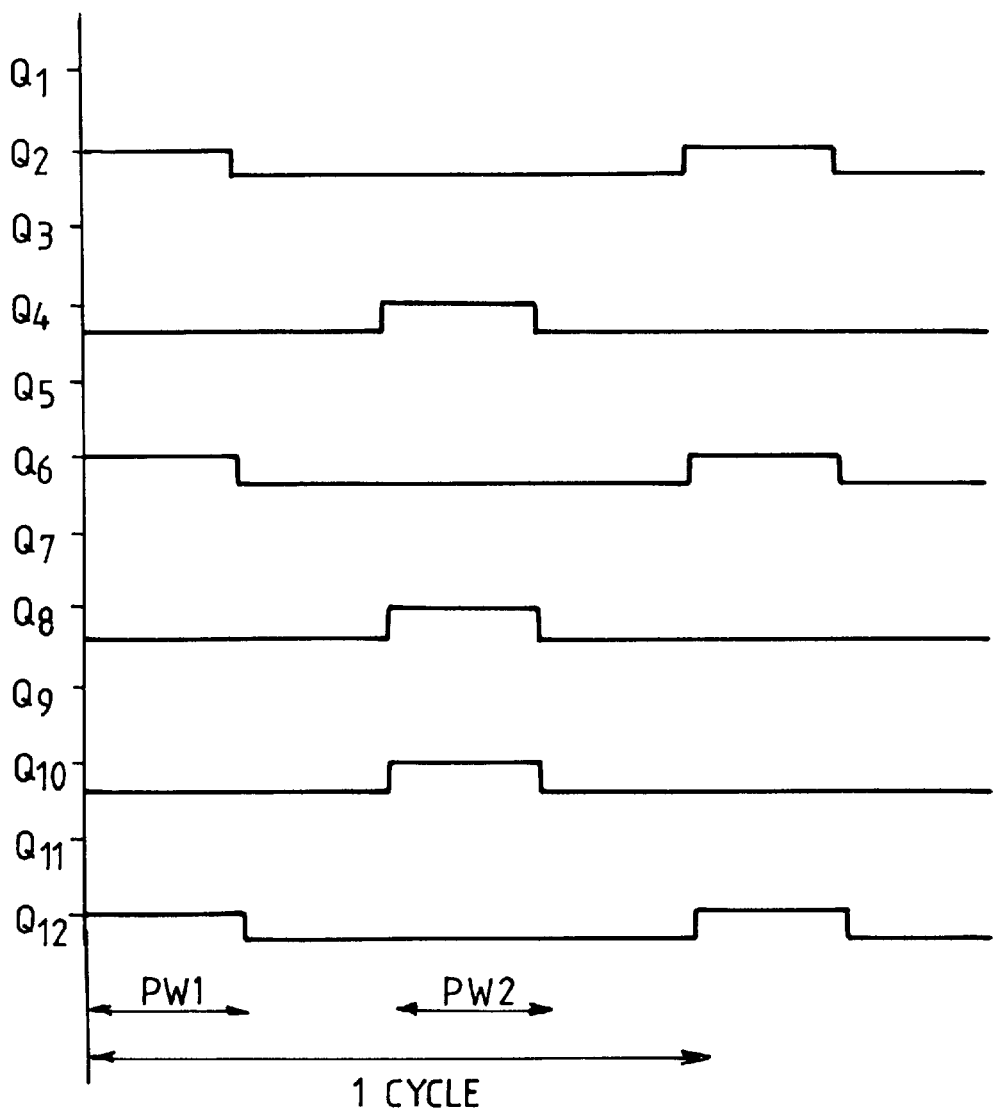

In this case, the switching waveforms for the first, second and third switching means 16, 18 and 19 are as illustrated in FIG. 23. This case is the exact reverse of Case 1, and therefore the switching waveforms are similar to that of Case 1 except that in this case transistors $Q_1$, $Q_3$, $Q_5$, $Q_7$, $Q_9$ and $Q_{11}$ all stay on during the whole cycle to provide a free-wheeling path for the current. The switching waveforms for the second switching means 18 and the third switching means 19 are the same as in Case 1, except in this case it is transistors $Q_6$, and $Q_{12}$ of the first switching means and transistors $Q_8$, and $Q_{10}$ of the second switching means 19 to which the switching waveforms are applied. Similarly, because in this case $V_{out}$ is greater than $V_{in}$, the polarity of the first switching means 16 is also reversed and in this case the switching waveforms are applied to transistors $Q_2$ and $Q_4$.

Case 4 $V_{in} > V_{out}$ $V_{in} < 0$ Vout $\leq 0$

Figure 24:
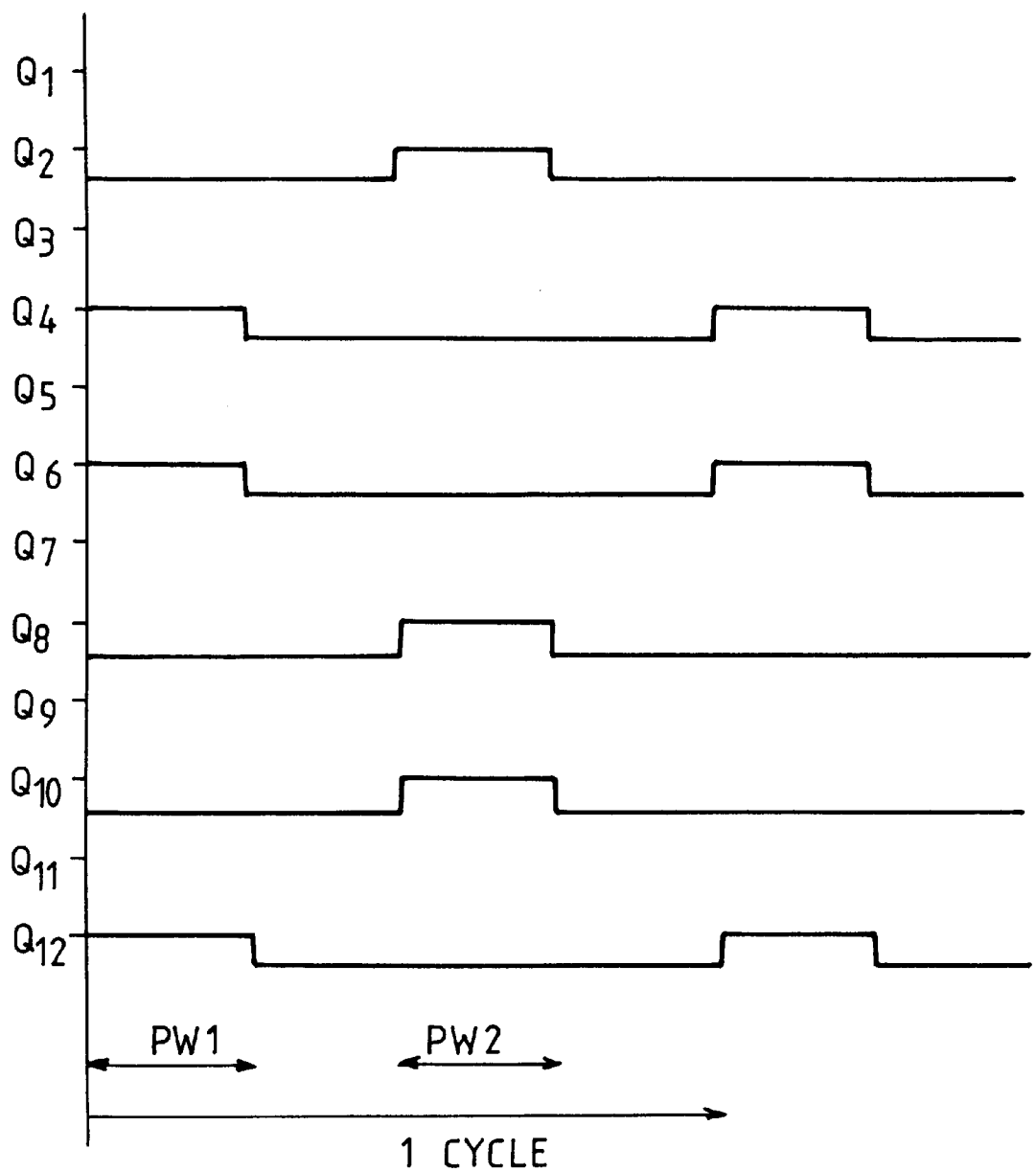

In this case, the switching waveforms applied to the first, second and third switching means 16, 18 and 19 are as illustrated in FIG. 24. The only difference between this case and the previous case is that $V_{in}$ is now greater than $V_{out}$. Hence, the switching waveforms applied to the second and third switching means 18, 19 are the same as in Case 3, however the switching waveforms applied to transistors $Q_2$ and $Q_4$ in the first switching means 16 have been swapped. Therefore, in this case the voltage across the second winding of the transformer $T_1$ is being subtracted from the voltage across the first winding of $T_1$.

In each of the four cases described above, the input voltage $V_{in}$ has been within the normal operating range of the UPS. Cases 5 and 6 below describe the operation of the UPS when the input voltage $V_{in}$ drops out of the normal operating range. As noted above in this mode the first switching means 16 is immediately switched OFF and the battery-powered switching section 28 is simultaneously switched ON.

Case 5 $V_{in}$ out of range, battery inverter ON, $V_{out} > 0$

Figure 25:
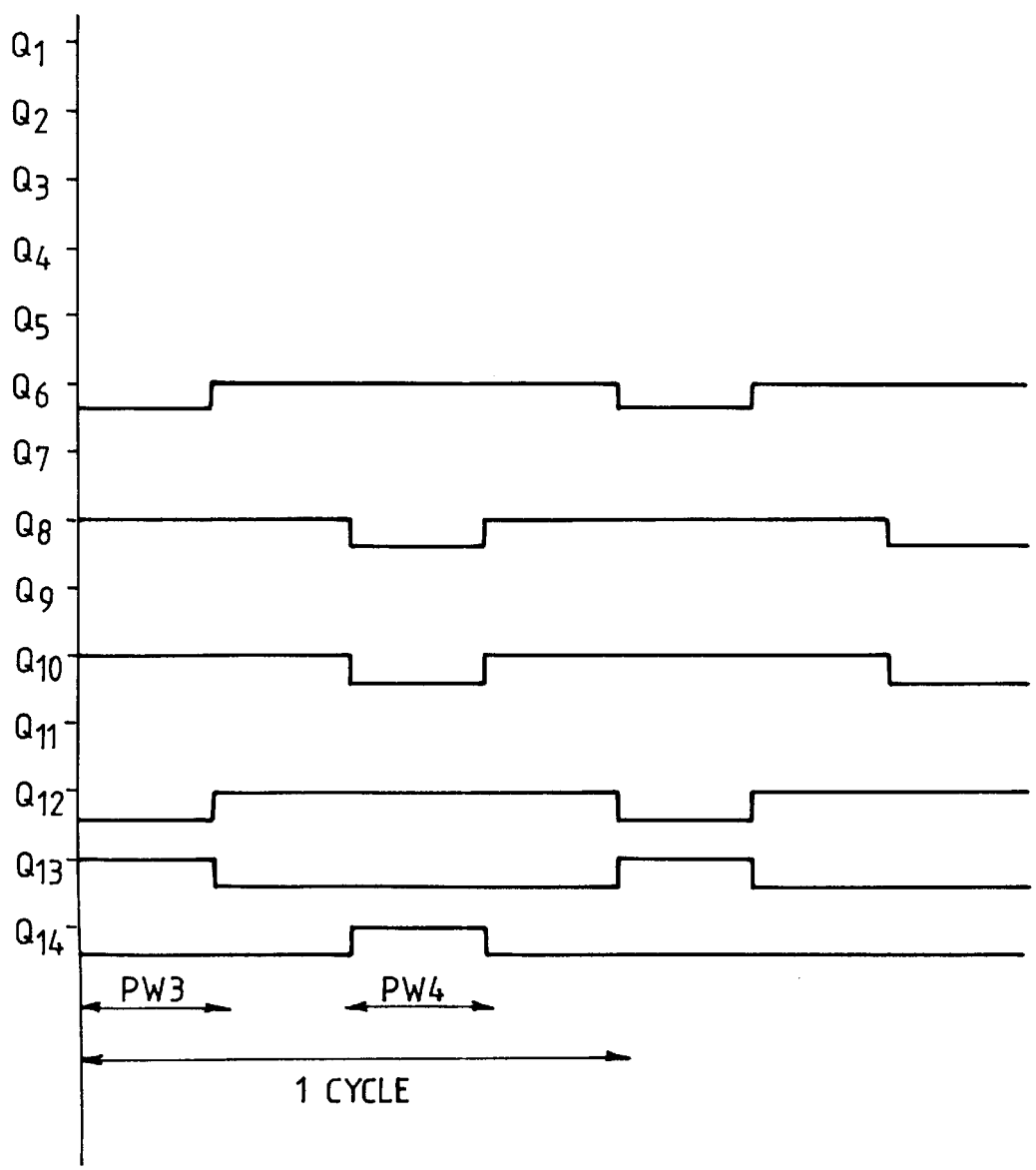

In this case, the switching waveforms applied to the respective switching means are as illustrated in FIG. 25. $Q_1$, $Q_2$, $Q_3$ and $Q_4$ of the first switching means 16a, 16b are all OFF in this mode. On the other hand, transistors $Q_{13}$ and $Q_{14}$ are switched with the pulse width modulated waveforms illustrated to apply an inverter DC voltage to the third winding of transformer $T_1$ which is inductably coupled to the second winding of $T_1$ in the input stage 12 of the UPS. The pulse width of the switching waveforms, PW3, PW4 are modulated to produce the desired waveform of the output voltage $V_{out}$. As before, PW3=PW4. Transistors $Q_5$, $Q_7$, $Q_9$ and $Q_{11}$ of the second and third switching means 18, 19 are ON continuously during the whole cycle to provide a free-wheeling path for the current.

Case 6 $V_{in}$ out of range, battery inverter ON, $V_{out} < 0$

Figure 26:
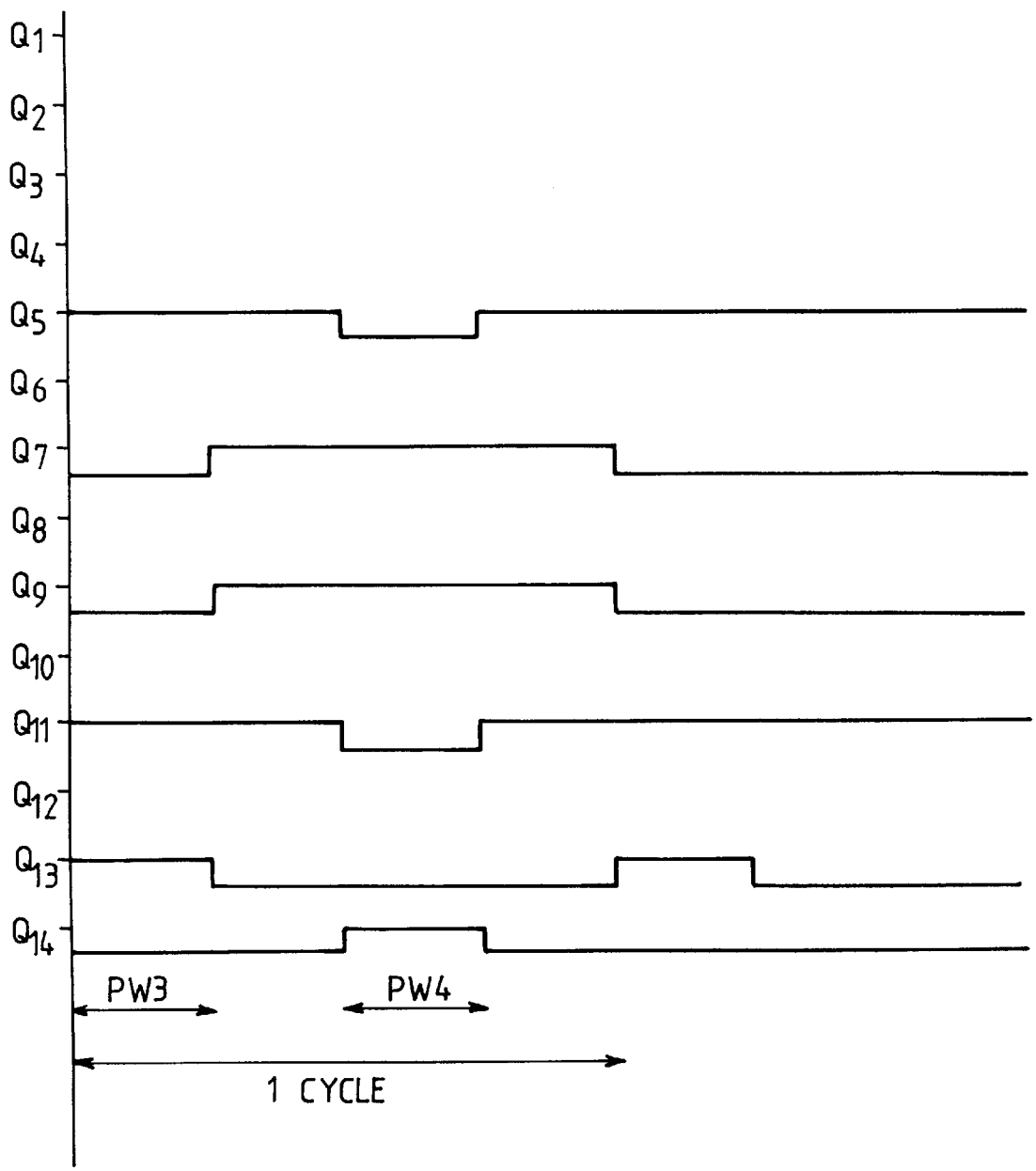

In this case, the switching waveforms applied to the second, third and fourth switching means 18, 19 and 25 are as illustrated in FIG. 26. The switching waveforms applied to transistors $Q_{13}$ and $Q_{14}$ of the fourth switching means 25 in the inverter 28 are the same as for Case 5. However, in this case the polarity of the switching voltage across the second winding of the transformer $T_1$ is reversed, and therefore transistors $Q_5$ and $Q_{11}$ of the second switching means and transistors $Q_7$ and $Q_9$ of the third switching means are switched in accordance with the waveforms illustrated in FIG. 26. Transistors $Q_6$, $Q_8$, $Q_{10}$ and $Q_{12}$ are ON continuously during the whole cycle to provide a free-wheeling path for the current. All other operating conditions are the same as with Case 5.

Now that several embodiments of the UPS in accordance with the invention have been described in detail, it will be apparent that the described UPS has a number of advantages over conventional UPS designs, including the following:

(i) directly converting from AC to AC eliminates many of the bulky components. There is only one inductor ($L_1$) as opposed to two, and only one storage capacitor ($C_2$) as opposed to two.

(ii) the single storage capacitor ($C_2$) is only required to filter out the high frequency component from the DC inverter circuit ($T_1$), and thus it can be much smaller and of lower cost.

(iii) replacement of the four bulky items in the conventional UPS with a single inductor and a small high frequency storage capacitor results in a huge reduction in physical size.

(iv) in one embodiment of the UPS of the inventoin the storage capacitor can be eliminated altogether.

(v) the remainder of the components in the UPS are mainly semiconductors which therefore lends itself to high integration.

(vi) all devices in the power switching stages are subjected to a maximum voltage of the peak of $V_{in}$ or $V_{out}$ or $V_{C2}$ (whichever is the higher) and thus the voltage rating of these devices need only be half of the output stage of the traditional UPS.

(vii) lower voltage devices generally allow higher switching speeds and lower ON state voltage. This also favours integration where many devices can be packed onto a single substrate and switched at high frequencies to reduce the size of the inductor and filter capacitors.

Numerous variations and modifications will suggest themselves to persons skilled in the electronics arts, in addition to those already described, without departing from the basic inventive concepts. For example, the transistors employed in the switching means can be any suitable switching device, for example, an IGBT. Also, in each of the described embodiments single phase operation only has been described. Multi-phase operation is similar but with duplicates of the UPS circuit for each phase. All such variations and modifications are to be considered within the scope of the present invention, the nature of which is to be determined from the foregoing description and the appended claims.

The claims defining the invention are as follows:

1. An uninterruptible power supply device, the device comprising:
   an input stage connected to an AC power supply and an output stage for supplying AC power to an appliance;
   a high frequency transformer;
   wherein said input stage has a first pair of switching means connected in series with the output stage and a second pair of switching means connected in parallel with the output stage, wherein each of said switching means is capable of switching current in two directions; and, wherein said first pair of switching means are respectively connected to the respective ends of a first winding of the high frequency transformer and said second pair of switching means are respectively connected to the respective ends of a second winding of the high frequency transformer;

a controller operatively connected to said first and second pairs of switching means for controlling the direction of current through each of the respective switching means in response to detected changes in power conditions whereby, in use, regulated AC power can be supplied from the output stage.

2. An uninterruptible power supply device as defined in claim 1, wherein each of said switching means comprises a pair of emitter connected transistors connected in parallel with a pair of diodes, the anodes of the diodes and the emitters of the transistors all being connected to a common node.

3. An uninterruptible power supply device as defined in claim 2, wherein said input stage and output stage share a common neutral line, and wherein said input stage and output stage each have a capacitor connected in parallel with the input and the output respectively.

4. An uninterruptible power supply device as defined in claim 1, wherein said input stage and output stage each have a capacitor connected in parallel with the input and the output respectively.

5. An uninterruptible power supply device as defined in claim 1, the device further comprising a battery-powered switching section for supplying back-up power in the event of interruption of power to the input stage.

6. An uninterruptible power supply device as defined in claim 5, the device further comprising a single storage capacitor connected to an output of said battery-powered switching section for filtering an output voltage from said switching section.

7. An uninterruptible power supply as defined in claim 1, wherein the input stage also has a third switching means connected in parallel with the output stage, and wherein said third switching means is also operatively connected to said controller.

8. An uninterruptible power supply as defined in claim 7, wherein said third switching means is one of a pair of third switching means respectively connected to the respective ends of the second winding of the transformer.

9. An uninterruptible power supply as defined in claim 8, wherein the device further comprises a battery-powered switching section for supplying back-up power in the event of interruption of power to the input stage.

10. An uninterruptible power supply as defined in claim 9, wherein said high frequency transformer has three separate windings, and said battery-powered switching section is coupled to the input stage via a third winding of the high frequency transformer.

11. An uninterruptible power supply device, the device comprising:

an input stage connected to an AC power supply and an output stage for supplying AC power to an appliance;

wherein said input stage has a first switching means connected in series with the output stage and a second switching means connected in parallel with the output stage, wherein each of said switching means is capable of switching current in two directions; and, a controller operatively connected to said first and second pairs of switching means for controlling the direction of current through each of the respective switching means in response to detected changes in power conditions whereby in use, regulated AC power can be supplied from the output stage;

wherein the output stage has a third switching means connected in series with the input stage and fourth switching means connected in parallel with the input stage, and said controller is also operatively connected to said third and fourth switching means.

12. An uninterruptible power supply device as defined in claim 11, wherein said input stage and output stage share a common neutral line and said first switching means and third switching means are connected in series with an inductor therebetween.

13. An uninterruptible power supply device, the device comprising:

an input stage connected to an AC power supply and an output stage for supplying AC power to an appliance;

wherein said input stage has a first switching means connected in series with the output stage and a second switching means connected in parallel with the output stage, wherein each of said switching means is capable of switching current in two directions;

a controller operatively connected to said first and second switching means for controlling the direction of current through each of the respective switching means in response to detected changes in power conditions whereby, in use, regulated AC power can be supplied from the output stage;

a battery-powered switching section for supplying back-up power in the event of interruption of power to the input stage; and a single storage capacitor connected to an output of said battery-powered switching section for filtering an output voltage from said switching section;

wherein fifth and sixth switching means are provided for connecting said battery-powered switching section to said input stage of the device, said fifth and sixth switching means also being operatively connected to said controller.

14. An uninterruptible power supply device as defined in claim 13, wherein each of said switching means comprises a pair of emitter connected transistors connected in parallel with a pair of diodes, the anodes of the diodes and the emitters of the transistors all being connected to a common node.

15. An uninterruptible power supply device as defined in claim 13, wherein said battery-powered switching section comprises a DC inverter.

16. A method of controlling an uninterruptible power supply device, the method comprising:

monitoring AC power supplied to an input stage of the device;

monitoring AC power supplied from an output stage of the device;

providing first and second switching means in the input stage connected in series and in parallel respectively with the output stage, and wherein each of said switching means is capable of switching current in two directions;

controlling the direction of current through each of the first and second switching means in response to detected changes in power conditions whereby in use, regulated power can be supplied from the output stage;

providing third and fourth switching means in the output stage connected in series and in parallel respectively with the input stage; and, controlling the direction of current through said third and fourth switching means in response to detected changes in power conditions.

17. A method of controlling an uninterruptible power supply device as defined in claim 16, further comprising:

providing a battery-powered switching section for supplying back-up power in the event of interruption of power supplied to the input stage, and wherein a single storage capacitor is connected to an output of said battery-powered switching section for filtering an output voltage from said switching section.

18. A method of controlling an uninterruptible power supply device as defined in claim 17, further comprising:

monitoring the voltage across said storage capacitor and comparing it with the voltage of the AC power supplied from the output stage.

19. A method of controlling an uninterruptible power supply device as defined in claim 18, further comprising:

comparing the voltage of the AC power supplied from the output stage with a reference voltage representing the desired output voltage of the device.

* * * * *